United States Patent
Chen et al.

(10) Patent No.: US 9,640,981 B2
(45) Date of Patent: May 2, 2017

(54) FREQUENCY-CONVERSION DIFFERENTIAL PROTECTION METHOD FOR OUTPUT TRANSFORMER OF STATIC FREQUENCY CONVERTER SYSTEM

(71) Applicants: NR ELECTRIC CO., LTD, Jiangsu (CN); NR ENGINEERING CO., LTD, Jiangsu (CN)

(72) Inventors: Jun Chen, Jiangsu (CN); Quanrong Shen, Jiangsu (CN); Wei Yan, Jiangsu (CN); Huimin Wang, Jiangsu (CN); Kai Wang, Jiangsu (CN); Huazhong Li, Jiangsu (CN)

(73) Assignees: NR Electric Co., Ltd., Nanjing (CN); NR Engineering Co., Ltd., Nanjing (CN)

( * ) Notice: Subject to any disclaimer, the term of this patent is extended or adjusted under 35 U.S.C. 154(b) by 108 days.

(21) Appl. No.: 14/426,873

(22) PCT Filed: Jul. 1, 2013

(86) PCT No.: PCT/CN2013/078552
§ 371 (c)(1),
(2) Date: Mar. 10, 2015

(87) PCT Pub. No.: WO2014/040448
PCT Pub. Date: Mar. 20, 2014

(65) Prior Publication Data
US 2015/0255978 A1 Sep. 10, 2015

(30) Foreign Application Priority Data
Sep. 11, 2012 (CN) .......................... 2012 1 0332624

(51) Int. Cl.
*H02H 7/04* (2006.01)
*H02H 7/045* (2006.01)

(52) U.S. Cl.
CPC .................................. *H02H 7/045* (2013.01)

(58) Field of Classification Search
CPC ........... H02H 7/04; H02H 7/046; H02H 7/045
(Continued)

(56) References Cited

U.S. PATENT DOCUMENTS

| | | | | |
|---|---|---|---|---|
| 2004/0041535 A1* | 3/2004 | Toyoda | ................. | H02P 25/024 318/700 |
| 2009/0174270 A1 | 7/2009 | Denk et al. | | |

(Continued)

FOREIGN PATENT DOCUMENTS

| | | |
|---|---|---|
| CN | 101710691 | 5/2010 |
| CN | 101958530 | 1/2011 |

(Continued)

OTHER PUBLICATIONS

English Abstract of CN101710691.
(Continued)

*Primary Examiner* — Dharti Patel
(74) *Attorney, Agent, or Firm* — Ladas & Parry LLP

(57) ABSTRACT

A frequency-conversion differential protection method for an output transformer of a static frequency convertor system. The method comprises: a protection device measuring a three-phase current at each side of an output transformer of an SFC system; according to the connection manner of the output transformer, using a triangle side as a reference to conduct phase correction on a star side; at the same time, taking into account different secondary rated currents at each side of the transformer to adjust a balance coefficient of each side, so as to form sampling values of a correcting current and a differential current at each side, and using a startup and shut-down protection algorithm free from frequency influence in generator protection to calculate amplitude values of the correcting current, the differential current and a restraint (Continued)

current; and according to the magnitudes of the differential current and the restraint current, using the ratio restraint differential characteristic to achieve the frequency-conversion ratio differential protection of the output transformer. The present protection method is suitable for large-scale frequency change. Compared with the current quick-breaking protection, the sensitivity of internal failure detection in the output transformer is greatly improved.

4 Claims, 2 Drawing Sheets

(58) Field of Classification Search
USPC .......................................................... 361/36
See application file for complete search history.

(56) References Cited

U.S. PATENT DOCUMENTS

| | | | | |
|---|---|---|---|---|
| 2013/0056985 A1* | 3/2013 | Lu | ........................... | H02H 7/067 |
| | | | | 290/44 |
| 2013/0328496 A1* | 12/2013 | Chen | .................. | H05B 37/0281 |
| | | | | 315/224 |
| 2014/0362627 A1* | 12/2014 | Sun | ....................... | H02M 7/003 |
| | | | | 363/132 |

FOREIGN PATENT DOCUMENTS

| | | |
|---|---|---|
| CN | 101976820 | 2/2011 |
| JP | H10327530 | 12/1998 |
| WO | WO2012113455 | 8/2012 |

OTHER PUBLICATIONS

English Abstract of CN101958530.
English Abstract of CN101976820.
English Abstract of JPH10327530.

* cited by examiner

FREQUENCY-CONVERSION DIFFERENTIAL PROTECTION METHOD FOR OUTPUT TRANSFORMER OF STATIC FREQUENCY CONVERTER SYSTEM

RELATED APPLICATION

This application is a national phase entry under 35 USC 371 of International Patent Application No PCT/CN2013/078552 filed on 1 Jul. 2013, which claims priority from Chinese patent Application No. 201210332624.4 filed on 11 Sep. 2012, the disclosures of which are incorporated in their entirety by reference herein.

FIELD OF THE INVENTION

The present invention relates to the field of relay protection for an electric power system, and in particular, to a frequency-conversion differential protection method for an output transformer of a static frequency converter (SFC) system and a corresponding relay protection device or monitoring device.

DESCRIPTION OF RELATED ART

An SFC system is generally applied to a pumped storage unit and a large gas turbine generator unit, to implement frequency-conversion start-up of the unit. Currently, domestic SFC systems are all devices imported from abroad. The relay protection of an SFC system is generally integrated in the SFC regulator. Frequencies of currents on high and low voltage sides of an output transformer of the SFC system are variable, and differential protection algorithms for conventional transformers are all based on power frequency current; therefore, the relay protection function is difficult to be applied to the output transformer. In addition, none of foreign SFC systems is configured with a differential protection function for an output transformer, and instantaneous overcurrent protection serves as primary quick protection; as a result, the sensitivity is low and it is harmful to a protected device.

SUMMARY OF THE INVENTION

Technical Problem

An objective of the present invention is to provide a frequency-conversion differential protection method for an output transformer of an SFC system, which uses a generator start-up and shutdown protection algorithm which unaffected by frequency to calculate amplitude values of the differential current and the restraint current of the output transformer, so as to implement biased differential protection, adapt to a large-scale frequency variation, and improve the sensitivity of detection on an internal fault of the output transformer.

Technical Solution

A technical solution used by the present invention is described as follows: in a frequency-conversion differential protection method for an output transformer of an SFC system, a protection device of the SFC system measures three-phase current on each side of the output transformer of the SFC system; phase correction and balance coefficient adjustment are performed on the current on each side of the output transformer according to the connection manner of the output transformer, to calculate sampling values of correcting current on each side and the differential current; a generator start-up and shutdown protection algorithm which unaffected by frequency is used to calculate amplitude values of the correcting current, the differential current, and the restraint current; and frequency-conversion differential protection for the output transformer is implemented by using biased differential characteristic and according to magnitudes of the differential current and the restraint current.

The output transformer includes a two-winding transformer or a three-winding transformer; according to the connection manner of the output transformer, triangle side is used as a reference to perform phase correction on the star side; and at the same time, in consideration of the secondary rated current on each side of the transformer are different, a balance coefficient on each side is adjusted, so as to calculate the sampling values of the correcting current on each side of the output transformer and the differential current.

The generator start-up and shutdown protection algorithm which unaffected by frequency is used to calculate the amplitude values of the correcting current, the differential current, and the restraint current, so as to adapt to a large-scale frequency variation, where the start-up and shutdown protection algorithm includes a zero crossing point integral algorithm and a current peak value determining method.

A method for calculating the balance coefficient on each side is the same as that in differential protection of a conventional transformer, and balance coefficient on high voltage side is set to $K_H$, balance coefficient on low voltage side 1 is set to $K_{L1}$, and balance coefficient on low voltage side 2 is set to $K_{L2}$; $i_{Ha,j}(k)$, $i_{Hb,j}(k)$, $i_{Hc,j}(k)$, $i_{L1a,j}(k)$, $i_{L1b,j}(k)$, $i_{L1c,j}(k)$, $i_{L2a,j}(k)$, $i_{L2b,j}(k)$ and $i_{L2c,j}(k)$ are calculated, which separately are sampling values of three-phase correcting currents on the high voltage side, the low voltage side 1 and the low voltage side 2; and three-phase differential currents are calculated by using the correcting current on the high and low voltage sides:

$$\begin{cases} i_{da}(k) = i_{Ha,j}(k) + i_{L1a,j}(k) + i_{L2a,j}(k) \\ i_{db}(k) = i_{Hb,j}(k) + i_{L1b,j}(k) + i_{L2b,j}(k) \\ i_{dc}(k) = i_{Hc,j}(k) + i_{L1c,j}(k) + i_{L2c,j}(k) \end{cases} \quad \text{formula (1)}$$

where $i_{da}(k)$, $i_{db}(k)$, and $i_{dc}(k)$ separately are sampling values of the three-phase differential currents.

By using the generator startup and shutdown protection algorithm which unaffected by frequency, amplitude values ($I_{Ha,j}$, $I_{Hb,j}$, and $I_{Hc,j}$) of the correcting currents on the high voltage side are calculated by using the sampling values of the correcting currents on the high voltage side; amplitude values ($I_{L1a,j}$, $I_{L1b,j}$, and $I_{L1c,j}$) of the correcting currents on the low voltage side 1 are calculated by using the sampling values of the correcting currents on the low voltage side 1; amplitude values ($I_{L2a,j}$, $I_{L2b,j}$, and $I_{L2c,j}$) of the correcting currents on the low voltage side 2 are calculated by using the sampling values of the correcting currents on the low voltage side 2; and amplitude values ($I_{da}$, $I_{db}$, and $I_{dc}$) of the differential currents are calculated by using the sampling values of the differential currents.

Restraint currents are calculated by using the correcting currents on the high and low voltage sides as follows:

$$\begin{cases} I_{ra} = \dfrac{I_{Ha,j} + I_{L1a,j} + I_{L2a,j}}{2} \\ I_{rb} = \dfrac{I_{Hb,j} + I_{L1b,j} + I_{L2b,j}}{2} \\ I_{rc} = \dfrac{I_{Hc,j} + I_{L1c,j} + I_{L2c,j}}{2} \end{cases} \quad \text{formula (2)}$$

where $I_{ra}$, $I_{rb}$, and $I_{rc}$ separately are three-phase restraint currents.

Frequency-conversion differential protection for the output transformer is implemented by using the biased differential characteristic and according to the magnitudes of the differential current and the restraint current, where the biased differential characteristic may be a bilinear or multi-linear biased characteristic, a dual-slope biased characteristic, or a variable-slope biased characteristic.

A differential protection operation equation of a bilinear biased characteristic is as follows:

$$\begin{cases} I_d > I_s & \text{when } I_r < I_t \\ I_d > I_s + k \cdot (I_r - I_t) & \text{when } I_r \geq I_t \end{cases} \quad \text{formula (3)}$$

where $I_r$ is the restraint current, $I_d$ is the differential current, $I_s$ is the differential protection start-up current, $I_t$ is the knee current, and k is the slope coefficient; and split-phase determining is used, and when the operation equation of the formula (3) is met, the differential protection of the output transformer operate.

Advantageous Effect

Beneficial effects of the present invention are described as follows: frequency-conversion differential protection for the output transformer of the SFC system is implemented, and the protection method in the present invention adapts to the large-scale frequency variation, and compared with instantaneous overcurrent protection, greatly improves the sensitivity of detection on an internal fault of the output transformer, and better ensures the security of a device.

DETAILED DESCRIPTION OF THE INVENTION

The following describes the technical solutions of the present invention in detail with reference to the accompanying drawings.

Figure 1:
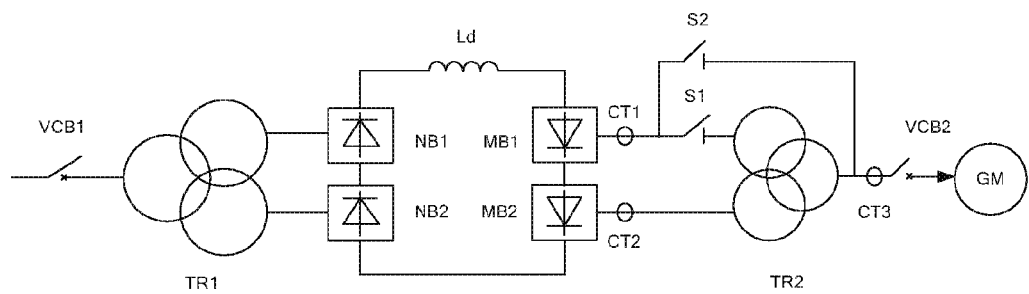
FIG. 1 is a schematic diagram of an SFC system and current measurement on each side of an output transformer according to the present invention, where TR1 is an input transformer, TR2 is the output transformer, Ld is a direct current reactor, NB1 is a network bridge side rectifier bridge 1, NB2 is a network bridge side rectifier bridge 2, MB1 is a machine bridge side inverter bridge 1, MB2 is a machine bridge side inverter bridge 2, VCB1 is an input circuit breaker, VCB2 is an output circuit breaker, S1 is an isolation switch on a low voltage side of the output transformer, S2 is an isolation switch at a bypass, CT1 and CT2 separately are current transformers on low voltage side 1 and 2 of the output transformer, and CT3 is a current transformer on a high voltage side of the output transformer.

In FIG. 1, three-phase currents on all sides are measured from CTs on high and low voltage sides of an output transformer, and sampling values of the correcting current and the differential current on each side of the output transformer are obtained after phase correction and balance coefficient adjustment are performed on the current on each side of the output transformer according to the connection manner of the output transformer.

According to the connection manner of the output transformer, triangle side is used as a reference to perform phase correction on star side; at the same time, in consideration of the secondary rated current on each side of the transformer are different, a balance coefficient on each side is adjusted, so as to calculate the sampling values of the correcting current on each side and the differential current. Using a Y, d, d-11 connection manner as an example, the positive direction is defined as the current on each side flow into the transformer, sampling values of three-phase currents on high voltage side of the output transformer are set to $i_{Ha}(k)$, $i_{Hb}(k)$, and $i_{Hc}(k)$, sampling values of three-phase currents on the low voltage side 1 are set to $i_{L1a}(k)$, $i_{L1b}(k)$, and $i_{L1c}(k)$, and sampling values of three-phase currents on the low voltage side 2 are set to $i_{L2a}(k)$, $i_{L2b}(k)$, and $i_{L2c}(k)$, so as to perform phase correction on the three-phase currents on the high voltage side as the following formula:

$$\begin{cases} i'_{Ha}(k) = \dfrac{i_{Ha}(k) - i_{Hb}(k)}{\sqrt{3}} \\ i'_{Hb}(k) = \dfrac{i_{Hb}(k) - i_{Hc}(k)}{\sqrt{3}} \\ i'_{Hc}(k) = \dfrac{i_{Hc}(k) - i_{Ha}(k)}{\sqrt{3}} \end{cases} \quad \text{formula (1)}$$

where $i'_{Ha}(k)$, $i'_{Hb}(k)$, and $i'_{Hc}(k)$ are sampling values of the three-phase currents after phase correction is performed on the high voltage side.

A method for calculating the balance coefficient on each side is the same as that in differential protection of conventional transformer, and balance coefficient on high voltage side is set to $K_H$, balance coefficient on low voltage side 1 is set to $K_{L1}$, and balance coefficient on low voltage side 2 is set to $K_{L2}$, so that a computing formula of the sampling values of the correcting currents on the high and low voltage sides is as follows:

$$\begin{cases} i_{Ha,j}(k) = i'_{Ha}(k) \cdot K_H \\ i_{Hb,j}(k) = i'_{Hb}(k) \cdot K_H \\ i_{Hc,j}(k) = i'_{Hc}(k) \cdot K_H \\ i_{L1a,j}(k) = i_{L1a}(k) \cdot K_{L1} \\ i_{L1b,j}(k) = i_{L1b}(k) \cdot K_{L1} \\ i_{L1c,j}(k) = i_{L1c}(k) \cdot K_{L1} \\ i_{L2a,j}(k) = i_{L2a}(k) \cdot K_{L2} \\ i_{L2b,j}(k) = i_{L2b}(k) \cdot K_{L2} \\ i_{L2c,j}(k) = i_{L2c}(k) \cdot K_{L2} \end{cases} \quad \text{formula (2)}$$

where $i_{Ha,j}(k)$, $i_{Hb,j}(k)$, and $i_{Hc,j}(k)$ separately are sampling values of three-phase correcting currents on the high voltage side, $i_{L1a,j}(k)$, $i_{L1b,j}(k)$, and $i_{L1c,j}(k)$ separately are sampling values of three-phase correcting currents on the low voltage side 1; and $i_{L2a,j}(k)$, $i_{L2b,j}(k)$, and $i_{L2c,j}(k)$ separately are sampling values of three-phase correcting currents on the low voltage side 2.

Three-phase differential currents are calculated by using the correcting current on the high and low voltage sides:

$$\begin{cases} i_{da}(k) = i_{Ha,j}(k) + i_{L1a,j}(k) + i_{L2a,j}(k) \\ i_{db}(k) = i_{Hb,j}(k) + i_{L1b,j}(k) + i_{L2b,j}(k) \\ i_{dc}(k) = i_{Hc,j}(k) + i_{L1c,j}(k) + i_{L2c,j}(k) \end{cases} \quad \text{formula (3)}$$

where $i_{da}(k)$, $i_{db}(k)$, and $i_{dc}(k)$ separately are sampling values of the three-phase differential currents.

By using start-up and shutdown protection algorithm (for a zero crossing point integral algorithm and a current peak value determining method, see "Chen Deshu. Principle and Technology for Computer Relay Protection [M]. Beijing: China Electric Power Press, 1992.") which unaffected by frequency and maturely applied in generator protection, amplitude values ($I_{Ha,j}$, $I_{Hb,j}$, and $I_{Hc,j}$) of the correcting currents on the high voltage side are calculated by using the sampling values of the correcting currents on the high voltage side; amplitude values ($I_{L1a,j}$, $I_{L1b,j}$, and $I_{L1c,j}$ $I_{L1c,j}$) of the correcting currents on the low voltage side 1 are calculated by using the sampling values of the correcting currents on the low voltage side 1; amplitude values ($I_{L2a,j}$, $I_{L2b,j}$, and $I_{L2c,j}$) of the correcting currents on the low voltage side 2 are calculated by using the sampling values of the correcting currents on the low voltage side 2; and amplitude values ($I_{da}$, $I_{db}$, and $I_{dc}$) of the differential currents are calculated by using the sampling values of the differential currents.

Restraint currents are calculated by using the correcting currents on the high and low voltage sides as follows:

$$\begin{cases} I_{ra} = \dfrac{I_{Ha,j} + I_{L1a,j} + I_{L2a,j}}{2} \\ I_{rb} = \dfrac{I_{Hb,j} + I_{L1b,j} + I_{L2b,j}}{2} \\ I_{rc} = \dfrac{I_{Hc,j} + I_{L1c,j} + I_{L2c,j}}{2} \end{cases} \quad \text{formula (4)}$$

where $I_{ra}$, $I_{rb}$, and $I_{rc}$ separately are three-phase restraint currents.

Figure 3:
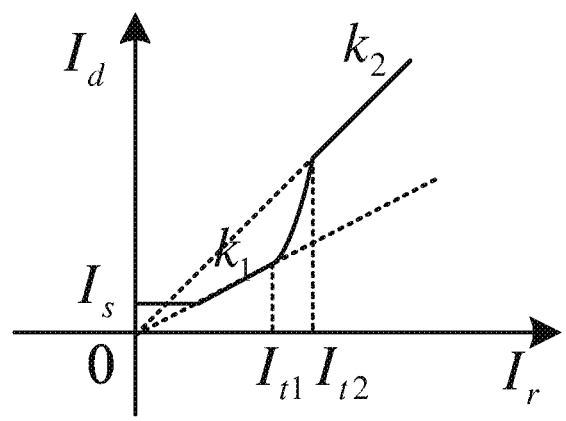
FIG. 3 is a diagram of a dual-slope biased characteristic, where $I_r$ is the restraint current, $I_d$ is the differential current, $I_s$ is the differential protection start-up current, $k_1$ and $k_2$ respectively are the slope coefficient 1 and slope coefficient 2, $I_{t1}$ and $I_{t2}$ are the knee current 1 and knee current 2, and a fitting curve exists between the two knee currents.
Figure 4:
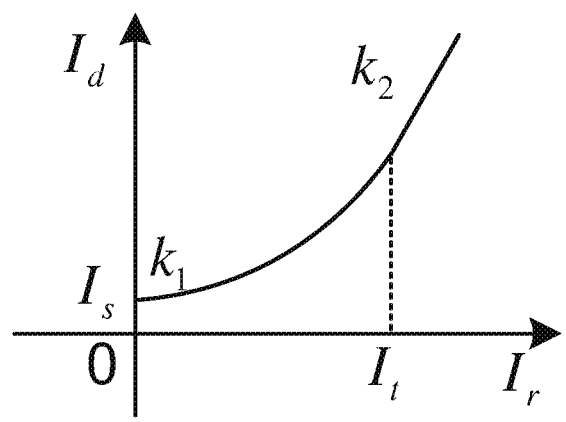
FIG. 4 is a diagram of a variable-slope biased characteristic, where $I_r$ is the restraint current, $I_d$ is the differential current, $I_s$ is the differential protection start-up current, $k_1$ and $k_2$ respectively are the initial slope and maximum slope, $I_t$ is the knee current, and a variable-slope fitting curve exists between the initial slope and the maximum slope.

Frequency-conversion differential protection for the output transformer is implemented by using the biased differential characteristic and according to the magnitudes of the differential current and the restraint current. The biased differential characteristic may be a bilinear or multi-linear biased characteristic, a dual-slope biased characteristic, or a variable-slope biased characteristic (see "Gao Chunru. Setting Calculation and Operation Technology of Relay Protection for Large Generator Unit (second edition) [M]. Beijing: China Electric Power Press, 2010.") shown in FIG. 2, FIG. 3, and FIG. 4.

Figure 2:
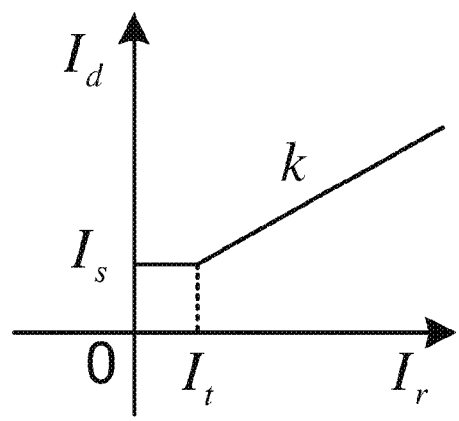
FIG. 2 is a diagram of a bilinear biased characteristic, where $I_r$ is the restraint current, $I_d$ is the differential current, $I_s$ is the differential protection start-up current, $I_t$ is the knee current, and k is the slope coefficient.

Using the bilinear biased characteristic shown in FIG. 2 as an example, a differential protection operation equation is as follows:

$$\begin{cases} I_d > I_s & \text{when } I_r < I_t \\ I_d > I_s + k \cdot (I_r - I_t) & \text{when } I_r \geq I_t \end{cases} \quad \text{formula (5)}$$

where $I_r$ is the restraint current, $I_d$ is the differential current, $I_s$ is a differential protection start-up current, $I_t$ is a knee current, and k is a slope coefficient.

Split-phase determining is used, and when the operation equation of the formula (5) is met, differential protection of the output transformer operate.

The foregoing embodiments are merely used for describing the technical ideas of the present invention rather than limiting the protection scope of the present invention, and any variation made based on the technical solutions according to the technical ideas provided by the present invention shall fall within the protection scope of the present invention.

What is claimed is:

1. A frequency-conversion differential protection method for an output transformer of a static frequency converter (SFC) system, wherein a protection device measures three-phase currents on each side of the output transformer of the SFC system; according to the connection manner of the output transformer, triangle side is used as a reference to perform phase correction on the star side; at the same time, in consideration of the secondary rated current on each side of the transformer are different, a balance coefficient on each side is adjusted, to calculate sampling values of correcting current on each side and the differential current; a generator start-up and shutdown protection algorithm which unaffected by frequency is used to calculate amplitude values of the correcting current, the differential current, and the restraint current; and frequency-conversion differential protection for the output transformer is implemented by using a biased differential characteristic and according to magnitudes of the differential current and the restraint current.

2. The frequency-conversion differential protection method for an output transformer of an SFC system according to claim 1, wherein the used generator start-up and shutdown protection algorithm which unaffected by frequency comprises a zero crossing point integral algorithm or a current peak value determining method.

3. The frequency-conversion differential protection method for an output transformer of an SFC system according to claim 1, wherein according to the connection manner of the output transformer, triangle side is used as a reference to perform phase correction on the star side; at the same time, in consideration of the secondary rated current on each side of the transformer are different, the balance coefficient on each side is adjusted; in the case of a Y, d, d-11 connection manner of the transformer, a method for calculating the balance coefficient on each side is the same as that in differential protection of conventional transformer; and balance coefficient on high voltage side is set to $K_H$, balance coefficient on low voltage side 1 is set to $K_{L1}$, and balance coefficient on low voltage side 2 is set to $K_{L2}$, to obtain $i_{Ha,j}(k)$, $i_{Hb,j}(k)$, and $i_{Hc,j}(k)$, which separately are sampling values of three-phase correcting currents on the high voltage side, wherein $i_{L1a,j}(k)$, $i_{L1b,j}(k)$, and $i_{L1c,j}(k)$ separately are sampling values of three-phase correcting currents on the low voltage side 1, and $i_{L2a,j}(k)$, $i_{L2b,j}(k)$, and $i_{L2c,j}(k)$ separately are sampling values of three-phase correcting currents on the low voltage side 2;

three-phase differential currents are calculated by using the correcting current on the high and low voltage sides:

$$\begin{cases} i_{da}(k) = i_{Ha,j}(k) + i_{L1a,j}(k) + i_{L2a,j}(k) \\ i_{db}(k) = i_{Hb,j}(k) + i_{L1b,j}(k) + i_{L2b,j}(k) \\ i_{dc}(k) = i_{Hc,j}(k) + i_{L1c,j}(k) + i_{L2c,j}(k) \end{cases} \quad \text{formula (1)}$$

wherein $i_{da}(k)$, $i_{db}(k)$, and $i_{dc}(k)$ separately are sampling values of the three-phase differential currents;

by using the generator start-up and shutdown protection algorithm which unaffected by frequency, amplitude values $I_{Ha,j}$, $I_{Hb,j}$, and $I_{Hc,j}$ of the correcting currents on the high voltage side are calculated by using the sampling values of the correcting currents on the high voltage side; amplitude values $I_{L1a,j}$, $I_{L1b,j}$, and $I_{L1c,j}$ of the correcting currents on the low voltage side 1 are calculated by using the sampling values of the correcting currents on the low voltage side 1; amplitude values $I_{L2a,j}$, $I_{L2b,j}$, and $I_{L2c,j}$ of the correcting currents on the low voltage side 2 are calculated by using the sampling values of the correcting currents on the low voltage side 2; and amplitude values $I_{da}$, $I_{db}$, and $I_{dc}$ of the differential currents are calculated by using the sampling values of the differential currents;

restraint currents are calculated by using the correcting currents on the high and low voltage sides as follows:

$$\begin{cases} I_{ra} = \dfrac{I_{Ha,j} + I_{L1a,j} + I_{L2a,j}}{2} \\ I_{rb} = \dfrac{I_{Hb,j} + I_{L1b,j} + I_{L2b,j}}{2} \\ I_{rc} = \dfrac{I_{Hc,j} + I_{L1c,j} + I_{L2c,j}}{2} \end{cases} \quad \text{formula (2)}$$

wherein $I_{ra}$, $I_{rb}$, and $I_{rc}$ separately are three-phase restraint currents;

frequency-conversion differential protection for the output transformer is implemented by using the biased differential characteristic and according to the magnitudes of the differential current and the restraint current, wherein the biased differential characteristic may be a bilinear or multi-linear biased characteristic, a dual-slope biased characteristic, or a variable-slope biased characteristic;

the differential protection operation equation of a bilinear ratio restraint characteristic is as follows:

$$\begin{cases} I_d > I_s & \text{when } I_r < I_t \\ I_d > I_s + k \cdot (I_r - I_t) & \text{when } I_r \geq I_t \end{cases} \quad \text{formula (3)}$$

wherein $I_r$ is the restraint current, $I_d$ is the differential current, $I_s$ is a differential protection start-up current, $I_t$ is a knee current, and k is a slope coefficient; and split-phase determining is used, and when the operation equation of the formula (3) is met, differential protection of the output transformer operate.

4. The frequency-conversion differential protection method for an output transformer of an SFC system according to claim 1, wherein the biased differential characteristic comprises a bilinear or multi-linear biased characteristic, a dual-slope biased characteristic, or a variable-slope biased characteristic.

\* \* \* \* \*